(12) United States Patent
Krawczyk (10) Patent No.: US 10,298,636 B2
(45) Date of Patent: May 21, 2019

(54) INTERNET RADIO SONG DEDICATION SYSTEM AND METHOD

(71) Applicant: Pandora Media, Inc., Oakland, CA (US)

(72) Inventor: Jacek Adam Krawczyk, San Francisco, CA (US)

(73) Assignee: Pandora Media, LLC, Oakland, CA (US)

( * ) Notice: Subject to any disclaimer, the term of this patent is extended or adjusted under 35 U.S.C. 154(b) by 116 days.

(21) Appl. No.: 14/713,688

(22) Filed: May 15, 2015

(65) Prior Publication Data

US 2016/0337421 A1 Nov. 17, 2016

(51) Int. Cl.
*H04L 29/06* (2006.01)
*H04L 12/58* (2006.01)
*G06Q 30/06* (2012.01)

(52) U.S. Cl.
CPC ..... *H04L 65/4076* (2013.01); *G06Q 30/0631* (2013.01); *H04L 51/10* (2013.01); *H04L 51/24* (2013.01); *H04L 65/4069* (2013.01); *H04L 65/4084* (2013.01)

(58) Field of Classification Search
CPC ..... H04L 51/12; H04L 51/32; H04L 65/4076; H04L 65/4084
See application file for complete search history.

(56) References Cited

U.S. PATENT DOCUMENTS

| | | | |
|---|---|---|---|
| 7,082,469 B2 | 7/2006 | Gold | |
| 9,411,856 B1 * | 8/2016 | Stevens | G06F 16/2457 |
| 2002/0147699 A1 * | 10/2002 | Barile | G11B 27/036 |
| 2002/0178137 A1 * | 11/2002 | Hasegawa | G06Q 10/107 |
| 2005/0149515 A1 * | 7/2005 | Dengler | H04L 29/06 |
| 2006/0212444 A1 * | 9/2006 | Handman | G06Q 30/02 |
| 2006/0265489 A1 | 11/2006 | Moore | |
| 2008/0268772 A1 | 10/2008 | Linnamaki | |
| 2010/0205259 A1 * | 8/2010 | Vitaldevara | G06Q 10/107 709/206 |
| 2012/0254363 A1 * | 10/2012 | Martin | G06F 16/435 709/219 |
| 2013/0117468 A1 * | 5/2013 | Ibasco | H04L 12/189 709/248 |
| 2014/0122593 A1 | 5/2014 | Bachman et al. | |
| 2014/0207915 A1 | 7/2014 | Liu | |
| 2015/0106718 A1 * | 4/2015 | Boulter | G06F 16/9574 715/716 |
| 2015/0186454 A1 * | 7/2015 | Kim | H04L 65/60 707/758 |

OTHER PUBLICATIONS

PCT/2016/023081; International Search Report 210; dated Jun. 21, 2016.
PCT/2016/023081; Written Opinion 237; dated Jun. 21, 2016.

* cited by examiner

*Primary Examiner* — Jeong S Park
(74) *Attorney, Agent, or Firm* — Fenwick & West LLP (57) ABSTRACT

An Internet radio service supports song dedications. A user is able to listen to music on an Internet radio station and dedicate a song to another person. A notification alert is generated to notify the intended recipient that a dedication has been made. The intended recipient of the dedication is able to then access the dedicated song and any accompanying message. A public acknowledgement of the song dedication may also be made in social media.

24 Claims, 7 Drawing Sheets

FIG. 1

Dedicator — Sender of the dedication. Has been inspired by the music. Wants recipient to think of them in a certain way.

Recipient — Receiver of the dedication. Listens to the dedicated music. Processes what they think about dedicator.

Observer — Casual observer of dedication that took place. Listens to sample of dedication, can start station. Adjusts opinion of dedicator/recipient's relationship.

INTERNET RADIO SONG DEDICATION SYSTEM AND METHOD

FIELD OF THE INVENTION

The present invention is generally related to providing song dedications for an Internet radio service.

BACKGROUND OF THE INVENTION

There are a variety of different types of Internet radio services. Generally speaking, many Internet radios services permit a user freedom to subscribe to individual internet radio stations and to also create their own individual Internet radio station. The creation of an individual personalized Internet radio station may be based on user-provided preferences such as an initial song, a genre, or artist. The user preferences are used as a "seed" to generate the song playlist for a personalized Internet radio station. Additionally, in many approaches, a user may also input song ratings which will influence the selection of songs.

Thus, many Internet radio services permit each individual user to listen to their own personalized radio station or to subscribe to a station managed by another. However, this means that two different listeners will generally not be listening to the same songs at the same time. Additionally, there is no live DJ providing live commentary to facilitate social interactions over the air. As a result, many types of social interactions common in conventional AM and FM radio have not been possible in Internet radio services. Moreover, many types of social interactions in Internet Radio are still relatively primitive compared with social interactions in social media.

Embodiments of the present invention were developed in view of the above-described problems in providing social interactions in an Internet radio service.

SUMMARY OF THE INVENTION

An Internet radio service supports sharing song track dedications. An individual acting as a dedicator makes a decision to dedicate a song to an intended recipient. The intended recipient receives a notification of the song dedication. The recipient may then access the dedicated song and any accompanying message. In one embodiment, observers in social media may view a dedication acknowledgement. The ability of observers in social media to view the dedication acknowledgement may be based on rules such as the dedication having been accepted or the recipient having played the dedicated song. The observers may be limited based on a set of permissions or limited to a group within a social media site. In one embodiment the surprise and enjoyment factor is increased by excluding the song and song description from the notification. An Internet radio station may also be generated from the song dedication. User interfaces may be provided to aid users in dedicating songs, receiving notifications, listening to dedicated songs, and viewing or appreciating dedications in social media.

In one embodiment, a request is received by an Internet radio service to dedicate a song. A dedication notification is generated to provide the intended recipient a notification of a song dedication the option to accept the song dedication. Access to the dedicated song and any message component is provided in response to an acceptance. The dedicated song may be selected by a dedicator using a search function or by selecting a current or recently played song from a song playlist of the dedicator.

Another embodiment of a method includes generating a first Internet radio station having a first song playlist for a first user. The songs of the first song playlist are provided to a first client device of the first user. A request is received from the first user to generate a song dedication, dedicating a song track of the first song playlist to a second user. A dedication notification is generated for the second user, to provide the second user with a notification of a song dedication by the first user. In response to an acceptance decision, a second Internet radio station for the second user is generated that includes the dedicated song as the first song in a second song playlist. An acknowledgement of the song dedication is made in social media. The acknowledgment may include a short description of the dedication and access to the dedicated song and the second Internet radio station.

In one embodiment of a system, at least one server is provided to host a multitude of personalized Internet radio stations. The system includes means for receiving a song dedication. Means are provided for notifying an intended song recipient of the song dedication. Means are provided for access to the dedicated song for the intended recipient. Additionally, means are provided for an acknowledgment of the song dedication in at least one social media site.

DETAILED DESCRIPTION

Figure 1:
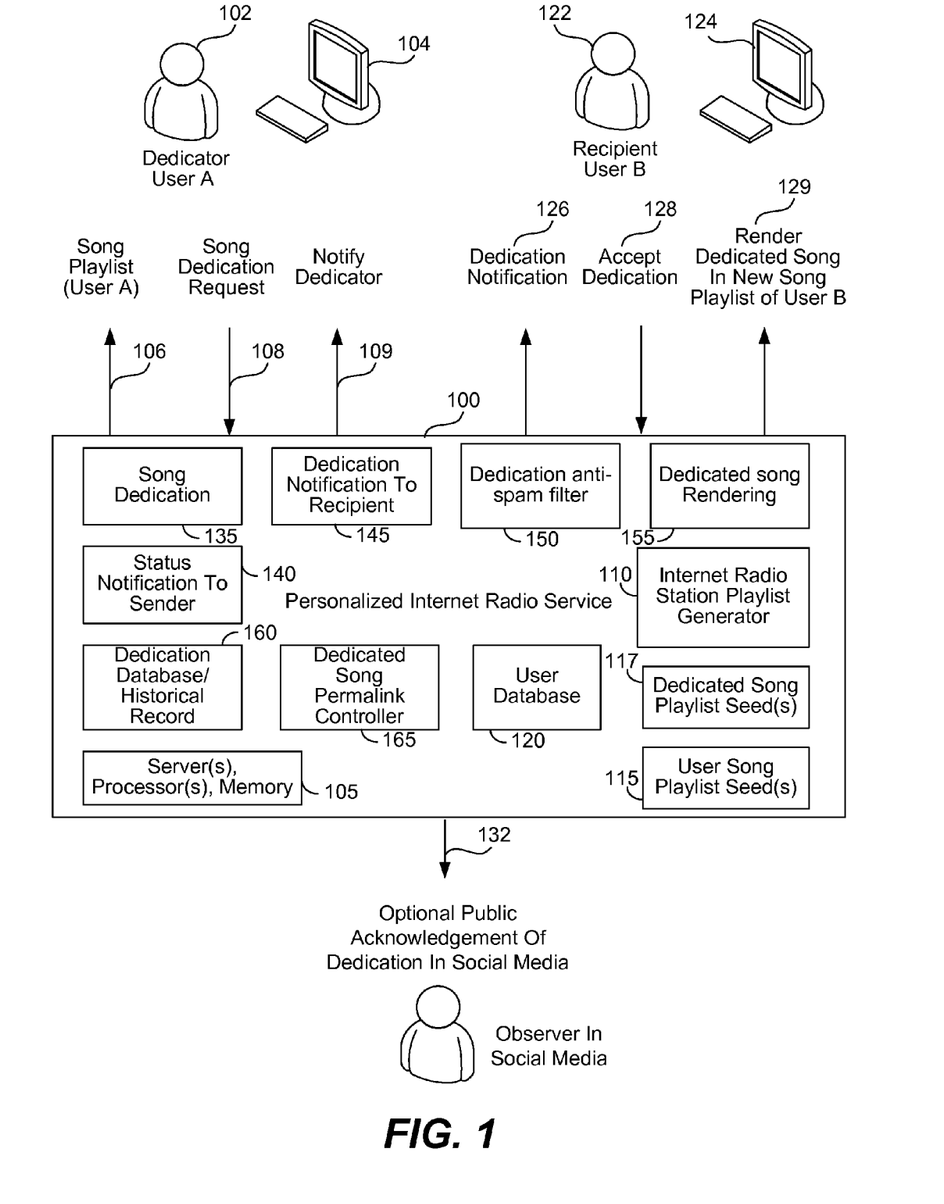
FIG. 1 is a block system diagram illustrating an Internet radio service supporting song track dedications in accordance with an embodiment of the present invention.

FIG. 1 illustrates a system 100 for providing a personalized Internet radio service with song dedications. The system 100 includes hardware 105 such as one or more servers, processors, and memory to support providing an Internet radio service. However, it will also be understood that other implementations are contemplated and that portions of the system may reside in different physical locations or in cloud-based services.

The system 100 includes a playlist generator 110 to generate a playlist for individual Internet radio stations. In one embodiment, an individual user may input musical preferences or other information as seed information 115 used to generate a personalized radio station. Techniques to generate a personalized radio station based on one or more initial musical preferences are well-known in the industry and pioneered by companies such as Pandora Media, Inc. of Oakland, Calif. The seed information 115 may be part of a user database 120 which records user profile information for individual users. An individual personalized radio station may also be customized based upon user feedback, such as song ratings of a user indicating whether users like or dislike individual songs. Alternatively, it will be understood that an individual user may subscribe to an Internet radio station hosted by the system 100, such as stations generated or otherwise managed by other users.

The system 100 includes features to support sharing song dedications. An individual user, such as User A 102, has a client computing device 104 capable of receiving an Internet Radio Station. As examples, the client computing device 104 may be a desktop computer, laptop computer, Smartphone, or other device having a processor, memory, a display, and a user interface.

In the role of a song dedicator, User A receives songs of a song playlist 106 of an Internet radio station generated for User A. A user interface is provided for User A to input a song dedication request 108 to an intended recipient, such as User B 122. The dedication request may be a free service, a limited free service (e.g., a limited number of free dedications per month, then a fee applies), or a pay-per-dedication service. Thus, in some embodiments, the dedicator may be requested to enter payment information for an individual dedication or to prepay for dedications. The dedication request may include information to contact an intended recipient such as a user ID, phone number, email address, text message service ID (such as a Skype account for Skype messaging), or other contact information required to reach the intended recipient User B, such a social media site account for messaging purposes. The dedication request may include a message entered by the dedicator. Additionally, some message components may be auto-generated "e.g., Sender sends a song dedication to recipient." Various rules may be applied as to when the dedication request must be made. As examples, the dedication request could be limited to the time when the song is being rendered, a grace period of time could be provided to make the dedication request after the song is rendered, or the user may be provided the option to make the dedication request for a recently played song in a history list of rendered songs. Options to search for songs for the specific purpose of making a song dedication may also be supported. User A may also be provided with notification of the status of the dedication and whether the intended recipient has played the dedicated song or issued a response message, such as a thank you message.

User B 122 has a client computing device 124, such as a desktop computer, laptop computer, or a mobile device, such as a Smartphone. User B, acting in the role of a song dedication recipient, receives a notification 126 alerting them that a song dedication has been made. The notification may be provided by email, text messaging, social media messaging, or other techniques. Notification may also be provided when User B logs into their account with the Internet radio service. The notification may include an identification of the dedicator and a short introduction, such as a statement that the dedicator has dedicated a song for the recipient. In one embodiment, the notification does not include the song title in order to preserve the element of surprise. Additionally, in one embodiment, the notification does not provide the message in order to increase the surprise to the recipient. However, it will be understood that in some embodiments the song title is provided in the notification alert and/or the message may be provided in the notification alert. User B is then provided with an option to accept the dedication 128. In one embodiment, the notification includes a link or other feature that when selected triggers the launching of a personalized Internet radio station for User B. This results in the rendering of the dedicated song in a new song playlist 129 of User B. The message from the dedicator may also be displayed.

In one embodiment, the dedicated song is used as seed information 117 to generate a new radio station for User B. For example, if the dedicated song track is Billy Joel's "Uptown Girl," then musically similar songs may be selected for the new radio station. In one embodiment, the dedicated song appears first in the new playlist of the new station. The new station may also be given a station name based on the dedication be taking some of the attributes of the dedication for the name of the new station.

More generally, the new station may be based on the dedicated song and any other information that may be inferred from the dedication. For example, the message content of the dedication may also be analyzed to identify key words to further refine the generation of a new station. Other attributes associated with the dedication could also be analyzed for information to generate a new station. People dedicate songs for a variety of reasons, some of which are associated with particular days and times of the year. For example a dedication on Valentine's Day may indicate that a romantic feeling is intended, while a dedication on Mother's Day may indicate that a warm family feeling is intended.

It will also be understood that in alternate embodiments the dedicated song could be provided in other ways besides being in a new station, such as providing a "stand alone" song play option. However, the creation of a new station based on the dedicated song provides a completely new form of dedication in which the song is dedicated and a new radio station based on the information in the dedication is also generated to play musically similar songs.

In one embodiment, a public acknowledgement 132 is made of the song dedication. The acknowledgement may, for example be posted or otherwise be made available in one or more social media sites or through a site hosted by the personalized Internet radio service. In one embodiment, the public acknowledgement 132 is a permalink that may be posted on social media by the dedicator, either directly or indirectly on behalf of the dedicator by the Internet radio service. Thus, an observer can observe that a dedication tool place. In one embodiment the observer can review a dedication summary (e.g., "Hank has dedicated a song to Lisa"), sample the dedicated song, and launch the new station based on the dedication. However, more generally, some control and options may be provided as to whether a third party observer can observe specific message portions of the dedication. That is, in some embodiments, the dedications include a private message portion that only the recipient can view. For example, public message portions (e.g., "Hank has dedicated a song to Lisa") may be made available to the observer while private message portions (e.g., "I love you Lisa") may be viewed only by the recipient. The public message portions may be auto-generated. However, it will be understood that users may be provided with options to create public message portions available to the observers (e.g., "Hank wants to shout out to the whole world that he loves Lisa").

In some situations, the dedicator and the recipient may want wide public access to the dedication acknowledge. However, more generally some users may desire to limit the potential viewing audience of the dedication acknowledgement. It will be understood that privacy options may be provided for the dedicator and the recipient to limit the potential universe of observers that may see the dedication.

This may include temporal limitations on how long observers may view the dedication acknowledgement and providing the user control over the social media sites where a permalink to the public acknowledgement is made available. For example, a permalink to the dedication may be made available to observers in a social media site having privacy controls, such as on a Facebook™ page having privacy limitations on who can read, comment, and share postings. Additionally, the public observation may be made conditional on the recipient having accepted the dedication. For example, the observation may be made conditional on the recipient having rendered the dedicated song. It will be understood that the control features may also be extended, if desired, to include providing options for the recipient to veto making the dedication available to observers.

The ability to provide additional layers of control over which parties may observe the dedication provides a completely new type of dedication service not possible in conventional radio. For the first time users have a convenient way to control the distribution of dedications. Additionally, observers may be provided access to the new station that is generated based on the dedication.

In some embodiments, the system is configured to add an element of surprise for the recipient and the observer. In this embodiment, the recipient is notified of a dedication but the notification does not include the song title or other information identifying the song. Similarly, in some embodiments, the observer may also see a dedication without a song title or other song dedication information. Preventing parties from seeing a song title until they select a link to access the song increases the element of surprise, enhancing the user experience.

Exemplary software modules are now described to support the system 100. These includes a song dedication module 135 to receive and process incoming song dedications, a module 140 to send dedication status information to the sender, a module 145 to send a dedication notification to the recipient, and an anti-spam filter 150 to filter out spam dedications. The anti-spam filter 150 may, for example, filter out song dedications that may be malicious attacks, such as phishing attacks. Additionally, in some embodiments, a user may also request that the spam filter be programmed to block the receipt of dedications from selected users. A dedicated song rendering module 155 may be provided to support rendering a dedicated song for the recipient. For example, special rules may be applied to play the dedicated song first in a playlist and to support replaying the dedicated song or provide other support for the user receiving the dedicated song and any supporting messages or functionality. A dedication database 160 may be provided to create an historical record of dedications and associated user ID information for the dedicator and the recipient. For example, a record of a unique dedication may include a user ID, a song track ID, a unique ID of the recipient, and a time stamp.

A dedicated song permalink controller 165 supports providing permalinks for song dedications and also implementing any privacy controls or other privacy rules to limit when, where, and to whom permalinks acknowledging song dedications are available. In one embodiment an individual permalink has an associated permalink ID and the dedicated song permalink controller may be triggered to make available a permalink for a song dedication after the recipient has viewed the dedication. The permalink may be posted in a social media site of the Internet radio service or posted by or on behalf of the song dedicator in other social media, such as on one or more social media sites or on specific social media pages. Moreover, while permalinks are one way to post dedication acknowledgments to social media, it will be understood that in alternate embodiments any technique to post a dedication acknowledgement to social media and provide access to the dedicated song may be used.

Figure 2:
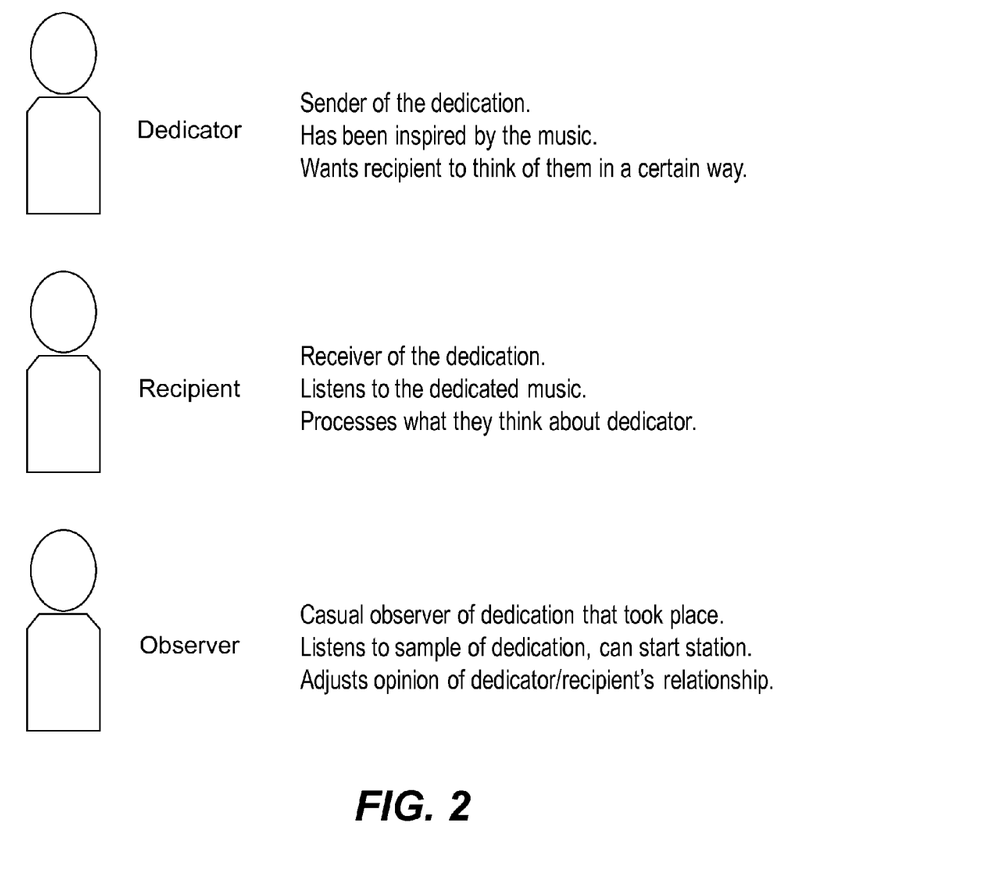
FIG. 2 illustrates examples of roles of different actors in a dedication process in accordance with an embodiment of the present invention.

FIG. 2 shows an exemplary set of roles for a dedicator, recipient and observer. One aspect of the roles is that each actor can act at different times. The dedicator can dedicate a song at time T0. Typically one song track would be dedication to one person. However, it will be understood that two or more songs may be dedicated to one person at a time, should for example a user desire to express their feelings by dedicating a set of songs. Additionally, dedications to more than two people are contemplated, such as dedicating a song to two or more relatives or friends (e.g., "Bob dedicates this song to his Mom and Dad"). The recipient receives a notification alert, which that can be acted upon at a convenient time for the recipient, such as time T1. In one embodiment, a permalink is generated for an observer to see a dedication acknowledgement and play the dedicated song. The observer may observe the dedication at a different time, such as time T2. In some embodiments, a rule may be employed that an observer can only observe a song dedication after it is accepted by the recipient or after the dedicated song is rendered. The observer may also be blocked from receiving any private message portion of the dedication. Additional rules may be employed to block observation or to make the dedication self-disappearing to observers based on user preferences or selected conditions. As examples, rules may be employed to permit a dedicator or a recipient the option to block future observation of the dedication or to allow outsider observers to view the dedication for a limited period of time.

Figure 3:
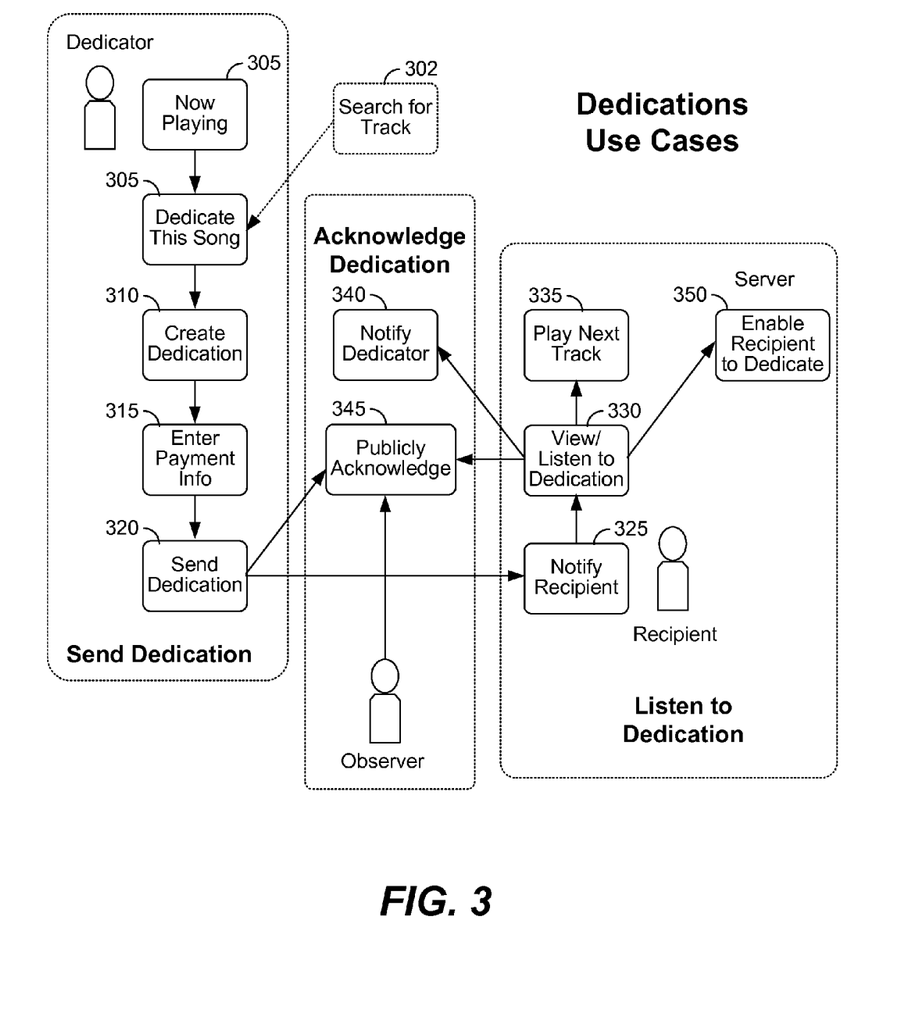
FIG. 3 illustrates examples of dedication use cases in accordance with an embodiment of the present invention.

FIG. 3 illustrates an example of a dedications user flow with a dedicator, recipient and observer. In this example, the dedicator is listening to songs that are now being played on their Internet radio station. The user makes a decision to dedicate 305 the currently played song or to search 302 for a track to dedicate. The search feature may be to search previously rendered tracks, although more generally the search feature may include a capability to search for tracks by name, genre, or other attributes from a database of song tracks. The user creates a dedication 310 and enters any required payment information 315. The dedication is then sent 320, which results in the recipient receiving an alert notifying 325 the recipient of the dedication. The recipient can then view the dedication and listen to the dedicated song 330. The recipient can the play the next track 335. In one embodiment, the dedicated song is used to generate a new radio station for the recipient and the user has to option to have the next song in the playlist of the new station rendered or to switch to another station. The recipient may also issue a thank you or otherwise notify the dedicator 340 of their opinion of the dedication. In one embodiment, the dedication is publicly acknowledged 345. In one embodiment, a recipient is supported to make their own dedication after they have accepted a dedication 350. This support may include, for example, enabling dedication, providing a certain number of free dedications, or providing additional information on how to make dedications.

Figure 4:
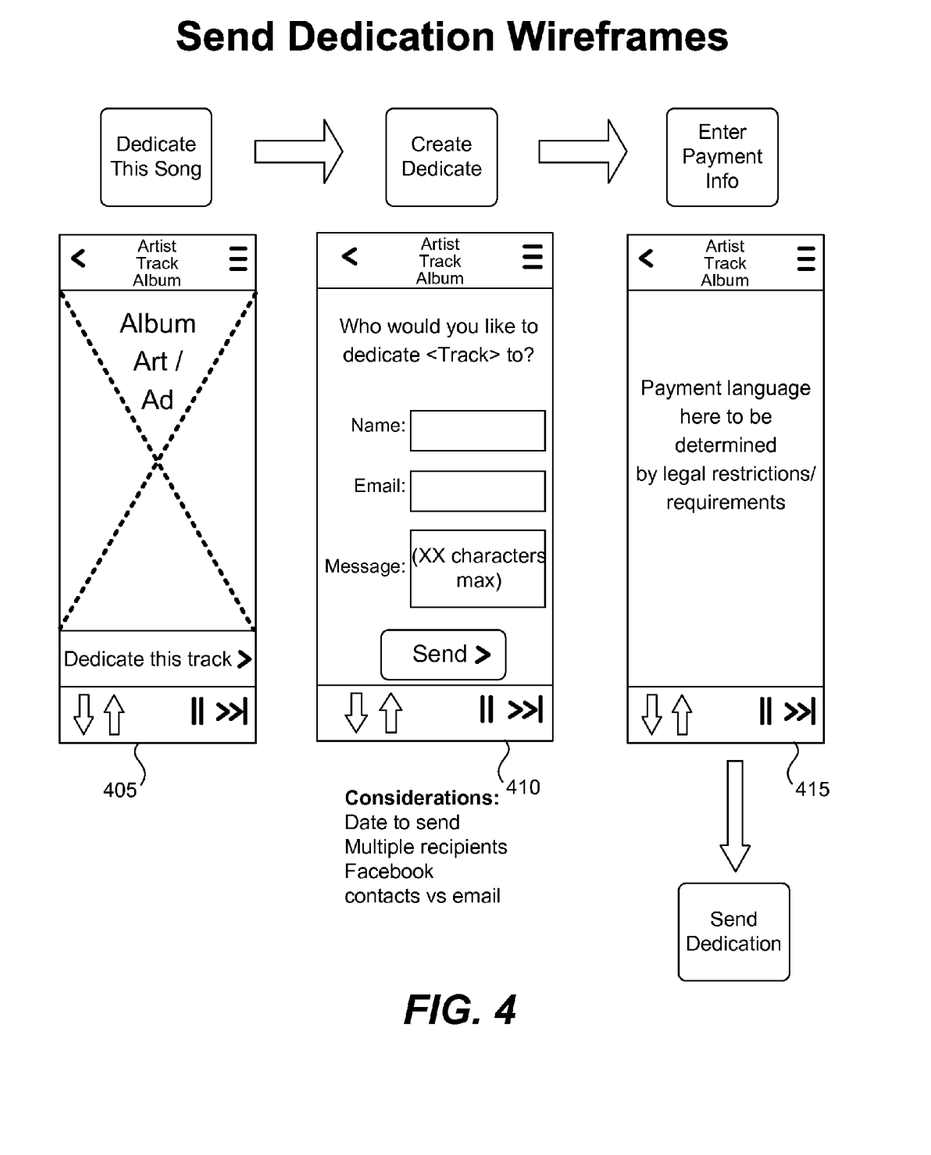
FIG. 4 illustrates wireframes of user interfaces for sending dedications in accordance with an embodiment of the present invention.

FIG. 4 illustrates wireframes of a user interface for sending dedications in accordance with an embodiment of the present invention. The wireframe of a first user interface 405 to dedicate a song may include information to identify the song track such as the Artist, Track, and Album; other optional information may include Album Art or an Ad. The first user interface may include an option to dedicate the song track. A second user interface 410 is used to create the dedication. The second user interface may include fields to input the contact information of the recipient, such as a name field and email field, although fields for other types of contact information may be included. A message field is provided for a dedicator to enter a message. A send button may be provided to send the dedication. Other variations may include a date to send, multiple recipients, and adding other types of contacts such as social media contacts. For embodiments requiring payment, a third user interface 415 may be provided for a user to enter payment information and inform the dedicator on any applicable legal restrictions or requirements, such as an age restriction or a notification that a charge will be made to a credit card of the dedicator.

Figure 5:
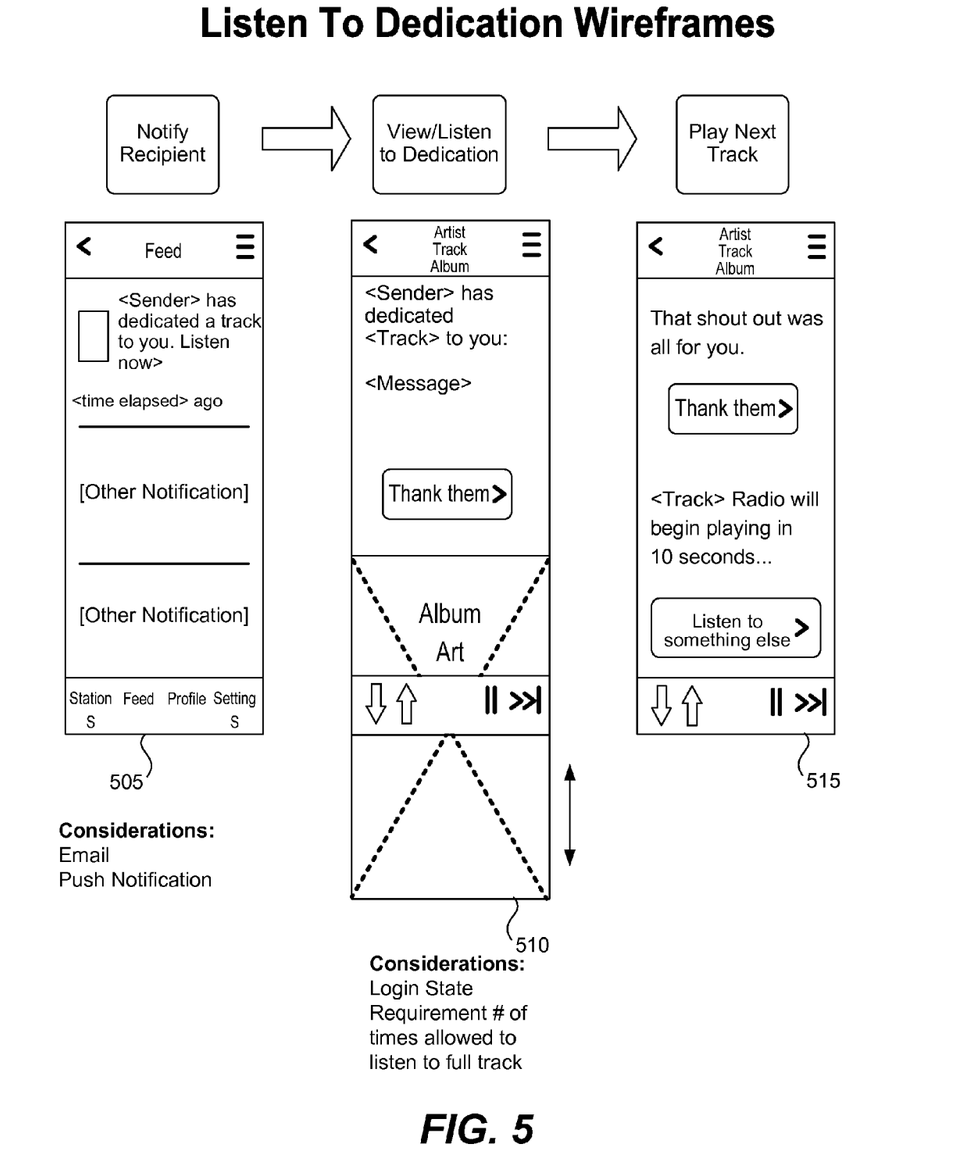
FIG. 5 illustrates wireframes of user interfaces for listening to dedications in accordance with an embodiment of the present invention.

FIG. 5 illustrates wireframes of a user interface to listen to dedications. A first user interface 505 notifies the recipient that a sender has dedicated a song track and invites the recipient to listen to the track. In this example, the first user interface 550 is illustrated as a notification feed. In this example, the notification alert does not include the song title in order to preserve the element of surprise. The sender's name may be combined with a short computer generated statement, such as "Jack has dedicated a song to you. Listen Now." The notification feed may be transmitted to client devices by various means, including email and push notification.

A second user interface 510 is generated after the recipient has selected the "listen now" link. The second user interface 510 provides to the dedicated song track and permits view of any private message components of the dedication. The second user interface 510 opens up a player of the Internet radio service to play the song and show any associated album art. Additionally, an option is provided to thank the dedicator or send a message to the dedicator.

Options may be provided for the recipient to listen to the dedicated track once only, for a limited number of times, or for an unlimited number of times, depending on implementation. In one embodiment, launching of the second user interface 510 corresponds to launching of an Internet radio station via the Internet radio service such that options may be provided regarding whether any additional login requirements are required. A third user interface 515 shows the playing of the next track for the recipient. As previously discussed, the next track may be part of a playlist of a radio station generated from the dedicated song. In one embodiment, the user is also provided the option to switch to another station and listen to something else within a selected time window or the option to listen to another station.

Figure 6:
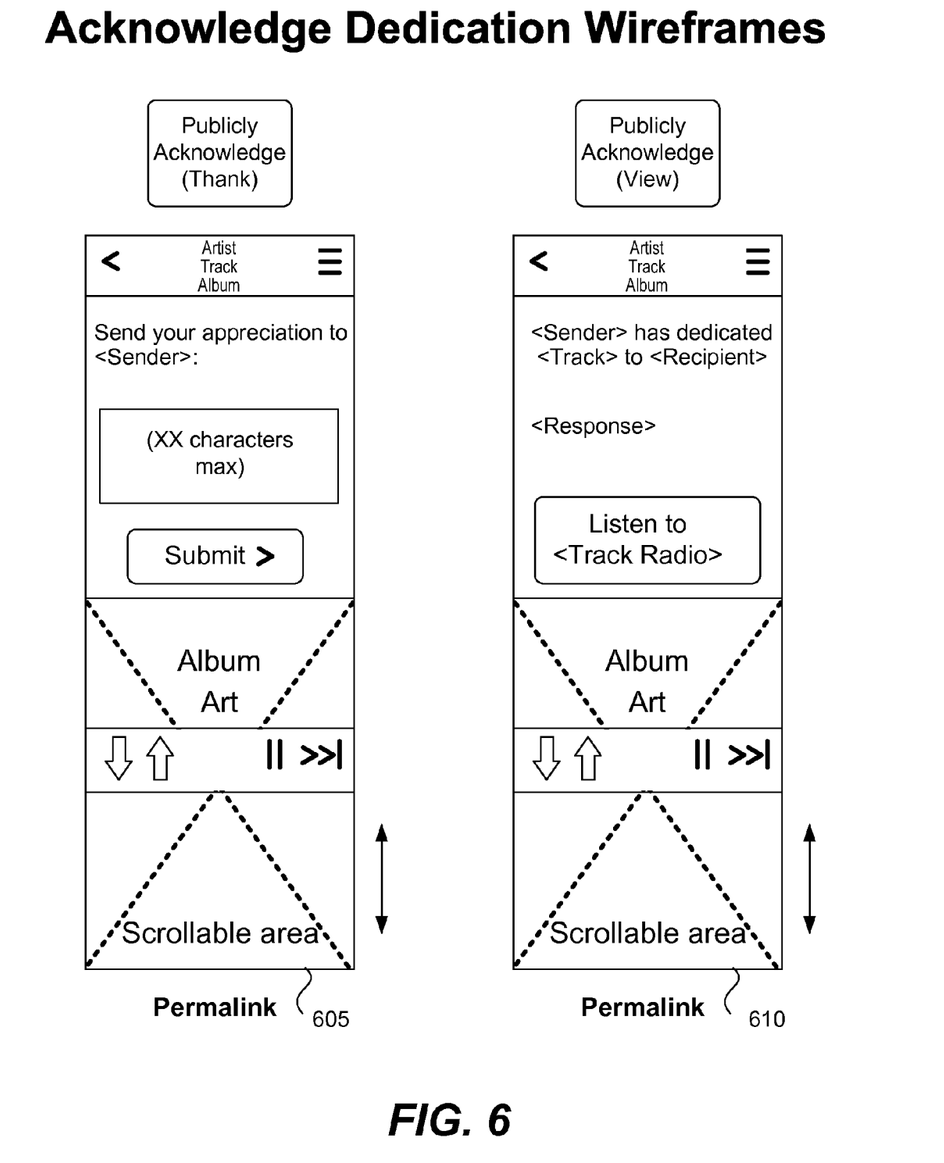
FIG. 6 illustrates wireframes of user interfaces for observers to acknowledge a dedication in accordance with an embodiment of the present invention.

FIG. 6 illustrates wire frames of a public acknowledgement user interface, which in one embodiment is accessed via permalinks A first user interface 605 permits an appreciation to be sent from an observer to the dedicator thanking them for the pleasure of learning about the dedication and the dedicated song. A second user interface 610 supports listening to the dedicated song track, which may be in a new station generated from the dedicated song track. A button may be included for the observer to listen to the dedicated song.

Figure 7:
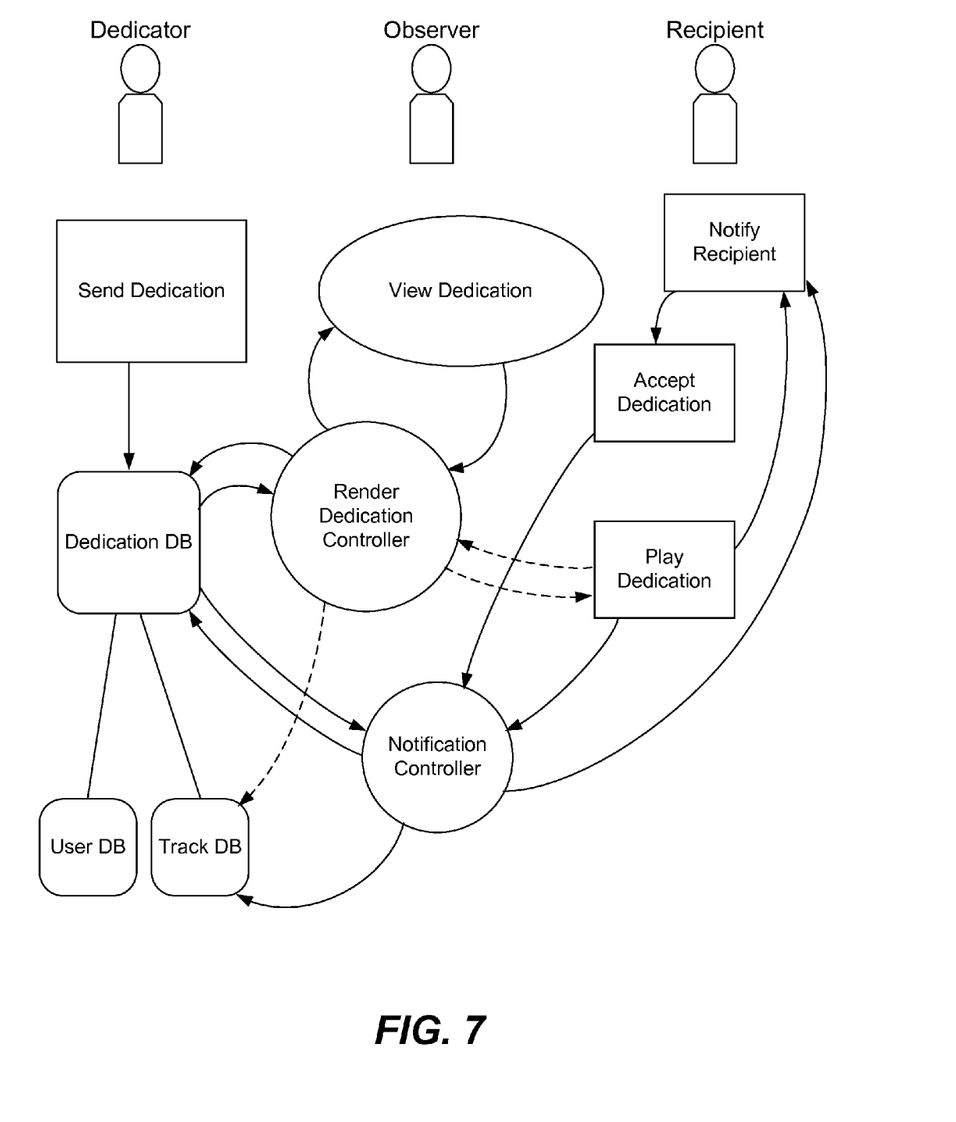
FIG. 7 illustrates aspects of a process flow for coordinating controllers and dedication databases in accordance with an embodiment of the present invention.

FIG. 7 illustrates an example of a sequence of process flows in an Internet radio service related to coordinating actions in accordance with an embodiment of the present invention. In one embodiment, aspects of the functionality are implements using a set of controllers, databases and modules performing specific functions. In this example, when a dedicator sends a dedication, it is recorded in the dedication database and may include a record for a unique dedication of a user ID, song track ID, unique ID of the recipient, and a time stamp. The notification controller is than provided the dedication record information to create a dedication, which then notifies the recipient. The recipient then accepts the dedication and the notification controller is updated on the status of the acceptance. The recipient may then play the dedication, which activates the render dedication controller. Activation of the render dedication controller also updates the dedication database. Access may then be provided for the observer to view the dedication acknowledgement via a permalink having a permalink ID and in accordance with any set of permissions enforced as a default or defined by user preferences.

Another aspect of the present invention is that individual embodiments support very efficient and user-friendly forms of song dedication. An individual user may make a song dedication with a small number of user inputs, such as a small number of mouse clicks or taps on a touch screen. Similarly, a recipient may accept a song dedication with a small number of inputs. In particular, in some embodiments a user may be listening to a song and with a single click or tap to a touch screen to initiate a song dedication for a currently played song via the user interfaces.

While examples of user interfaces have been described using graphical user interfaces, it will be understood that the user interfaces may more generally include voice-activated user interfaces or gesture-controlled user interfaces.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Embodiments of the present invention may also be tangibly embodied as a set of computer instructions stored on a computer readable medium, such as a memory device.

What is claimed is:

1. A method of providing song dedications within an Internet Radio Service, comprising:
   maintaining a system for generating personalized Internet radio stations and providing the personalized Internet radio stations to users over a network;
   receiving, at the system over the network, a request from a dedicator user to generate a song dedication to a recipient user, the request comprising an identifier of a dedicated song for the recipient user, an identifier of the recipient user, and a dedication message;
   generating, at the system, a dedication notification for the recipient user, the dedication notification providing the recipient user with a notification of the song dedication by the dedicator user;
   transmitting, by the system over the network, the dedication notification to the recipient user, the dedication notification comprising an identifier of the dedicator user, the identifier of the dedicated song, and the dedication message;

receiving, at the system over the network, an acceptance decision from the recipient user in response to the transmitted dedication notification, the acceptance decision comprising an indication that the recipient user accepts the song dedication; and in response to the acceptance decision, generating, by the system, a personalized Internet radio station for the recipient user based on the song dedication by the dedicator user by selecting, as songs for the personalized Internet radio station, the dedicated song and a plurality of songs selected based on a musical similarity to the dedicated song;

providing, by the system to a client device of the recipient user, access to the personalized Internet radio station including the dedicated song over the network; and in response to feedback received from the recipient user for at least a portion of the plurality of songs selected for the personalized Internet radio station, selecting, by the system, additional songs for the personalized Internet radio station based on the feedback.

2. The method of claim 1, further comprising receiving at the system over the network a search request from the dedicator user to find the dedicated song.

3. The method of claim 1, further comprising generating, at the system, a second song playlist associated with a second personalized Internet radio station for the dedicator user and transmitting over the network songs of the second song playlist to a client device of the dedicator user, wherein the dedicator user selects the dedicated song from songs of the second song playlist.

4. The method of claim 1, further comprising providing an acknowledgement of the song dedication in at least one social media site, wherein the acknowledgement has at least one message component different than the dedication notification.

5. The method of claim 1, wherein providing the acknowledgement of the song dedication comprises providing a permalink to the dedicated song.

6. The method of claim 1, wherein the dedication notification does not include a song title.

7. The method of claim 1, wherein the dedication notification is transmitted via at least one of email, a text message, and a social media message.

8. The method of claim 1, further comprising performing spam filtering on behalf of the recipient user including blocking receipt of song dedications from unauthorized users.

9. The method of claim 8, wherein the spam filtering includes blocking phishing attacks.

10. The method of claim 1, wherein the recipient user is provided an option to indicate that a particular user be added to a list of users blocked from making dedications to the recipient user.

11. The method of claim 1, further comprising:
receiving a message provided by the dedicator user with the request from the dedicator user to generate the song dedication to the recipient user;
analyzing the message to identify at least one of a keyword and an attribute associated with the message; and
refining the playlist of the personalized Internet radio station based on the at least one of the keyword and the attribute.

12. A method of providing song dedications in an Internet Radio Service, comprising:
maintaining a system for generating personalized Internet radio stations and providing the personalized Internet radio stations to users over a network;
receiving, at the system over the network, a request from a dedicator user to generate a song dedication to a recipient user, the request comprising an identifier of a dedicated song for the recipient user, an identifier of the recipient user, and a dedication message;
generating, at the system, a dedication notification for the recipient user;
transmitting, by the system over the network, the dedication notification to the recipient user, the dedication notification comprising an identifier of the dedicator user, the dedication message, and an option to accept the song dedication;
receiving, at the system over the network, an acceptance decision from the recipient user, the acceptance decision comprising an indication that the recipient user selected the option to accept the song dedication;
in response to the acceptance decision, generating, by the system, a personalized Internet radio station for the recipient user using the dedicated song as seed information by selecting, for a playlist of the personalized Internet radio station, a plurality of songs selected based on a musical similarity to the dedicated song;
inserting the dedicated song in the playlist of the personalized Internet radio station; and
based on feedback provided by the recipient user for at least a portion of the plurality of the songs of the playlist, selecting, by the system, additional songs for the playlist of the personalized Internet radio station generated for the recipient user.

13. The method of claim 12, wherein the playlist is based at least in part on the combination of the dedicated song and non-song information associated with the dedicated song.

14. A method of providing song dedications in an Internet Radio Service, comprising:
maintaining a system for generating personalized Internet radio stations and providing the personalized Internet radio stations to users over a network;
generating, at the system, a first Internet radio station for a first user having a first song playlist;
transmitting, by the system, songs of the first song playlist over the network to a client device of the first user;
receiving, at the system over the network, a request from the first user to generate a song dedication dedicating a song of the first song playlist to a second user, the request comprising an identifier of the dedicated song and an identifier of the second user;
generating, at the system, a dedication notification for the second user, the dedication notification providing the second user with a notification of the song dedication by the first user;
transmitting, by the system over the network, the dedication notification to the second user, the dedication notification comprising an identifier of the first user, and the dedication notification not including a title of the dedicated song;
receiving, at the system over the network, an acceptance decision from the second user in response to the transmitted dedication notification, the acceptance decision comprising an indication that the second user accepts the song dedication;
in response to the acceptance decision, generating, by the system, a second Internet radio station for the second user by selecting, for the second Internet radio station, the dedicated song as the first song in a second song playlist of the second Internet radio station, and selecting additional songs in the second song playlist based at least in part on using the dedicated song as seed information and selecting the additional songs based on a musical similarity to the dedicated song;

streaming the second song playlist including the dedicated song from the system over the network to a second client device associated with the second user; and in response to feedback received from the second user for at least a portion of the additional songs in the second song playlist, selecting, by the system, further songs for the personalized Internet radio station based on the feedback.

15. The method of claim 14, wherein at least one other song of the second song playlist is generated based on the dedicated song.

16. The method of claim 14, further comprising notifying the first user that the second user has accepted the song dedication.

17. The method of claim 14 further comprising performing at the system in the network spam filtering to filter out unauthorized or malicious third party song dedications.

18. The method of claim 14, further comprising providing an acknowledgement of the song dedication in at least one social media site, wherein the acknowledgement of the song dedication comprises a permalink on the social media site.

19. A method of providing song dedications in an Internet Radio Service, comprising:

maintaining a system for generating personalized Internet radio stations and providing the personalized Internet radio stations to users over a network;

receiving a request from a first user to generate a song dedication for a second user, the song selected from a first playlist of a first Internet Radio Station associated with the first user, the request comprising an identifier of the dedicated song and an identifier of the second user;

generating a dedication notification for the second user, the dedication notification providing the second user with a notification of the song dedication by the first user;

transmitting, by the system over the network, the dedication notification to the second user, the dedication notification comprising an identifier of the first user and the identifier of the dedicated song;

receiving an acceptance decision from the second user, the acceptance decision comprising an indication that the second user accepts the song dedication;

in response to the acceptance decision, creating a second Internet radio station having a second playlist by selecting, as songs for the second playlist, the dedicated song and one or more additional songs selected based at least in part on using the song dedication as seed information based on a musical similarity to the dedicated song;

providing access to the second user to the second Internet radio station; and in response to feedback received from the second user for at least a portion of the songs in the second playlist, selecting further songs for the personalized Internet radio station based on the feedback.

20. The method of claim 19, wherein a combination of song information and non-song information of the song dedication is used as the seed information to generate at least a part the playlist of the second Internet radio station.

21. The method of claim 20, wherein the non-song information includes keywords of the song dedication.

22. The method of claim 20, wherein the non-song information includes a day of the year.

23. The method of claim 20, wherein the non-song information includes a time of the year.

24. A method of providing song dedications in an Internet Radio Service, comprising:

maintaining a system for generating personalized Internet radio stations and providing the personalized Internet radio stations to users over a network;

generating a playlist of songs for a first personalized Internet radio station for a first user of the system;

streaming, from the system over the network to a first client device, the playlist of songs of the first personalized Internet radio station for listening by the first user;

receiving over the network at the system, in response to playing a song of the first personalized Internet radio station on the first client device, a request from the first user to generate a song dedication dedicating the playing song to a second user, the request comprising an identifier of the playing song and an identifier of the recipient user;

generating, at the system, a dedication notification for the second user;

transmitting the dedication notification to the second user, the dedication notification comprising an identifier of the first user and an option to accept the song dedication;

receiving an acceptance decision from the second user, the acceptance decision comprising an indication that the second user selected the option to accept the song dedication;

in response to the acceptance decision, generating, by the system, a second personalized Internet radio station for the second user based on the song dedication by the first user by selecting, as songs for the second personalized Internet radio station, the dedicated song and additional songs selected based at least in part on a musical similarity to the dedicated song;

streaming the second personalized Internet radio station to a second client device of the second user; and in response to feedback received from the second user for at least a portion of the songs for the second personalized Internet radio station, selecting further songs for the personalized Internet radio station based on the feedback.

* * * * *